United States Patent Office 2,929,702
Patented Mar. 22, 1960

2,929,702

HERBICIDAL USE OF ALPHA-CHLOROACET-
AMIDES HAVING HETEROCYCLIC SUBSTIT-
UENTS ON THE AMIDE NITROGEN

Angelo J. Speziale, Kirkwood, Mo., assignor to Monsanto Chemical Company, St. Louis, Mo., a corporation of Delaware No Drawing. Application December 26, 1957
Serial No. 705,081

9 Claims. (Cl. 71—2.5)

This invention relates to a new class of herbicidal compounds and methods for their use as general herbicides. More particularly, this invention relates to pre-emergence methods of inhibiting the growth of plants, and especially grasses in the presence of other vegetation.

Many chemical compounds are known to be deleterious to the growth of vegetation and to have herbicidal effects under specific conditions, some of which compounds are known to be quite effective at low levels of application. It is, however, a more difficult problem to provide herbicides for selective activity on undesirable plants, but which are harmless to other vegetation. Compounds of this type are known, being primarily useful in eliminating broad leaf plants from grasses or grass-like cereal crops. This herbicidal activity is frequently related to the leaf area exposed to the herbicide, the plants with larger leaf areas being more susceptible to contact herbicides.

It is the primary purpose of this invention to provide a new and useful class of herbicides. A further purpose of the invention is to provide methods of inhibiting the growth of vegetation. A still further purpose is to provide a new selective pre-emergence herbicide, effective on grasses in the presence of broad leaved plants. Other purposes of the invention will be apparent from the following specification.

In accordance with this invention, it has been discovered that compounds of the following chemical structure have unusual and valuable herbicidal activity

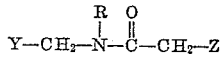

wherein Y is a monocyclic heterocyclic organic radical containing at least one divalent atom of the group consisting of oxygen and sulfur, Z is a halogen atom including chlorine, bromine, iodine and fluorine, and R is selected from the group consisting of hydrogen, alkyl radicals having up to six carbon atoms, alkenyl radicals having up to six carbon atoms, alkynyl radicals having up to six carbon atoms, the halo-substituted alkyl radicals having up to six carbon atoms, the halo-substituted alkenyl radicals having up to six carbon atoms, and the halo-substituted alkynyl radicals having up to six carbon atoms.

Suitable compounds for use in the practice of this invention are the alpha-haloacetamides, including the alpha-chloroacetamide, the alpha-bromoacetamide, the alpha-iodoacetamide and the alpha-fluoroacetamide, wherein one amide nitrogen substituent is a methyl group substituted by a heterocyclic oxygen or sulfur compound, said heterocyclic substituent on the methyl group being any of the following: furyl, thienyl, tetrahydrothienyl, tetrahydrofuryl, dihydrothienyl, dihydrofuryl, pyranyl, thiopyranyl, dioxanyl, thioxanyl, and the corresponding radicals which have halogen, alkyl having up to four carbon atoms, and nitro substituents, all of which radicals exist in a plurality of isomeric forms depending upon the relative positions of the radical valence bond and the substituent with respect to the hetero oxygen and/or sulfur atoms. The useful class of herbicides includes those in which the R is the hydrogen atoms, the alkyl radicals such as methyl, ethyl, propyl, isopropyl, n-butyl, primary isobutyl, secondary isobutyl, tertiary butyl, n-amyl, any of the branch chain amyls and any of the hexyl radicals; the alkenyl, including vinyl, allyl, crotyl, methallyl and methyl vinyl radicals; the alkynyl radicals, including propargyl, the halo-alkyl radicals, such as 2-chloroethyl, 2-chloropropyl, 3-chloropropyl, chloromethyl and 2-bromopropyl radicals; the halo-alkenyl radicals such as 2-chloroallyl, 3-chlorocrotyl, 3-chloroallyl, 2,3-dichloroallyl, 3-chloro-2-butenyl, 3-bromoallyl and 2-iodoallyl; and the halo-alkynyl radicals such as 2-chloropropargyl, 3-bromopropargyl and 4-chloromethyl propargyl.

A preferred group of herbicides has the structure,

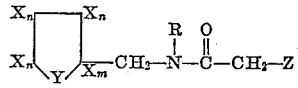

wherein Y is an atom of the group consisting of oxygen and sulfur; wherein Z is a halogen of the group consisting of bromine, chlorine and iodine; wherein X is a substituent selected from the group consisting of the hydrogen atom, halogen atoms, alkyl radicals having up to four carbon atoms, and the nitro radical; wherein R is a radical selected from the group consisting of alkyl having up to six carbon atoms, alkenyl having up to six carbon atoms, alkynyl having up to six carbon atoms, and the corresponding halogen-substituted radicals, wherein $n$ is an integer from one (1) to two (2), and wherein $m$ is an integer from zero (0) to one (1).

The new chemical compound may be prepared by the reaction of furfuryl amine, thenylamine or any of the methylamines containing saturated or unsaturated, four or five membered heterocyclic substituents, with alpha-haloacetyl chloride. The mixed heterocyclic-aliphatic types are prepared similarly with a secondary amine having one heterocyclic substituted methyl radical and one aliphatic radical. These reactions are preferably conducted at reduced temperatures and in the presence of aqueous sodium hydroxide. It is usually desirable to conduct the reaction in the presence of a suitable solvent, such as ethylene dichloride, from which the solid material may be crystallized. If desired, the compositions may be purified by recrystallization from the same or other solvents. Further details are set forth with respect to the following specific examples.

Example 1

A 500 ml. flask was charged with 39 g. of furfuryl amine, 120 ml. of 20 percent sodium hydroxide solution and 150 ml. of ethylene dichloride and the mixture cooled to −10° C. Over a 70-minute period, 67.2 g. of chloroacetyl chloride was gradually added and the mixture was then stirred for one-half hour, during which period the temperature rose to 10° C. The organic phase was separated and washed with water, 2 percent sodium hydroxide solution and water, and then dried over anhydrous magnesium sulfate. After removing the ethylene dichloride by vacuum distillation, the resulting solid product was recrystallized twice from a mixture of water and methanol and once from a benzene solution. The resulting crystalline product was identified as alpha-chloro-N-(2-furfuryl) acetamide.

Example 2

The procedure of Example 1 is repeated, except that tetrahydrofurfuryl amine is used in place of the furfuryl amine. The resulting compound having a melting point of 62.5 to 63.5° C. was N-tetrahydrofurfuryl alpha-chloroacetamide.

Example 3

By repeating the procedure of Example 1, except by using thenylamine, the resulting compound is N-thenyl alphachloroacetamide.

Example 4

By using the procedure described in Example 1, except with the substitution of thioxanylmethylamine, a compound identified as N-thioxanylmethyl alpha-chloroacetamide is produced.

Example 5

A sample of the composition prepared in accordance with Example 1 above was refluxed with acetone and an excess of potassium iodide. When the reaction was apparently complete, the reaction mixture was filtered and the acetone then evaporated. The resulting compound was identified as N-furfuryl alpha-iodoacetamide.

The relative value of each of the chloroacetamides was determined by planting in greenhouse flats seeds of eight different plants, each representing a principal botanical type. The flats were treated with the various herbicides, and the observations are set forth below with respect to each of several typical botanical specimens, each representing a principal type of plant:

A—Wild oat
B—Cheat grass
C—Rye
D—Buckwheat
E—Mustard
F—Beet
G—Cotton
H—Cucumber

The relative value of each compound with respect to its heribicidal effect on the various plants is indicated by a number as follows:

0—No phytotoxicity
1—Slight phytotoxicity
2—Moderate phytotoxicity
3—Severe phytotoxicity The N-furfuryl alpha-chloroacetamide was evaluated using an application of five pounds per acre, and was found to be quite effective on grasses, having substantially no effect on broad lead plants; thus:

| | A | B | C | D | E | F | G | H |
|---|---|---|---|---|---|---|---|---|
| N-furfuryl alpha-chloroacetamide | 3 | 3 | 2 | 0 | 0 | 0 | 0 | 1 |
| N-tetrahydrofurfuryl alpha-chloroacetamide | 3 | 3 | 3 | 0 | 0 | 1 | 0 | 3 |
| N-furfuryl alpha-iodoacetamide | 2 | 0 | 3 | 0 | 1 | 0 | 0 | 1 |

In order to demonstrate the different effects of closely related compounds, the identical tests were performed using N-phenyl alpha-chloroacetamide and the unsubstituted alpha-chloroacetamide.

| | A | B | C | D | E | F | G | H |
|---|---|---|---|---|---|---|---|---|
| N-phenyl alpha-chloroacetamide | 0 | 2 | 0 | 0 | 0 | 2 | 0 | 0 |
| Unsubstituted alpha-chloroacetamide | 0 | 2 | 0 | 0 | 0 | 1 | 0 | 0 |

Through the preparation and study of herbicidal properties of the N-substituted alpha-haloacetamides, the critical structure of the N-furfuryl alpha-haloacetamides has been learned. For example, it has been determined that the substituent on the alpha carbon atom may be any halogen; although the bromine and iodine analogues will have slightly lower pre-emergence activity, this is more than offset by its superior contact herbicidal utility.

The study of N-substituted alpha-halo-propionamides and N-substituted beta-halo-propionamides has established that the alpha carbon atom must not be substituted with another carbon atom. Similarly, it has been learned from the study of N-substituted alpha,alpha-dichloro acetamides and N-substituted alpha,alpha,alpha-trichloroacetamides that only a single halogen atom may be substituted on the alpha carbon atom.

Valuable herbicidal effects will be observed by applications of small amounts, for example as low as 0.5 pound of active component per acre as well as high concentrations, for example 100 pounds per acre. The selective activity on grasses is exhibited at lower rates of application, for example, from 2 to 15 pounds per acre. For general application and herbicidal effect on both the grasses and the dicotyledonous plants, it will be found necessary to use from 10 to 50 pounds per acre.

Selective herbicidal activity with respect to several genera of grasses is illustrated by the data in the above tables. Other experiments run with respect to plants of different genera, which have different metabolisms and physical characteristics, indicate little or no inhibition of growth. The three botanical types, or genera, of grasses which are effectively controlled by means of the alpha-haloacetamides of this invention embrace a large number of undesirable plants, or weeds, frequently found in vegetable crops. This invention is not limited to removing grasses from broad leaf plants, since the selective activity will be useful in removing weeds from corn, which belongs to a different genus of grass. Many other crops, and particularly the broad leaved plants, are inhibited by weeds of the wild oat, cheat and rye genera, which can be effectively controlled by the practice of this invention. In some instances, there are minor herbicidal effects on dicotyledonous plants, and therefore optimum results may depend to some extent on experience with respect to the activity of the particular N-substituted alpha-haloacetamide on the vegetable crop to be treated.

As demonstrated above, unusual grass specificity can be achieved at lower levels of applications; whereas, at higher levels of application, the N-substituted alpha-haloacetamides exhibit a more general herbicidal effect. This provides another and quite different utility in the removal of plants of a large number or all botanical genera. It will be apparent that quite different effects can be obtained by modifying the method of use. For this reason, an essential part of this invention is the formulation so as to permit a uniform predetermined application of herbicide to leaves or soil surfaces so as to produce the desired effect. By the proper selection and proportioning of the various adjuvant or conditioning agents, either liquid or solid formulations can be prepared, and so as to adapt the herbicide for achieving the desired result with any conventional device for treating plant or soil surfaces.

The solid formulations, frequently referred to as "dusts," may contain, in addition to the active ingredient, diluents or extenders, dispersing agents to prevent local high concentrations, and agents to facilitate distribution in soil or soil waters. Suitable solid diluents are those which render the compositions permanently dry and free-flowing. Thus, hygroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the bentonites and the attapulgites; other minerals in natural state, such as talc, pryophyllite, quartz, diatomaceous earth, fuller's earth, chalk, rock phosphate and sulfur; and the chemically modified minerals, such as the acid washed bentonite, precipitated calcium phosphate, precipitated calcium carbonate and collodial silica. These diluents may represent a substantial portion, for example, 50 to 98 percent by weight, of the entire formulation as applied to plant or soil. More concentrated herbicides will require dilution by the user in order to properly condition the soil for the most effective usage. The concentrated solid herbicidal formulations can be used with less danger if they are mixed with the surface soil by means of a disk-plow or harrow at the time of application.

The liquid compositions for herbicidal use may be solutions or other liquid dispersions. The choice of a liquid medium will depend to some extent upon the physical properties of the active ingredient. The N-substituted alpha-haloacetamides may be water-soluble and mere dissolution will then provide a usable formulation. Often the N-substituted alpha-haloacetamides are only limitedly soluble in water and, therefore, aqueous formulations will necessarily be dispersions of minute drops of the water-insoluble substances in suspension in an aqueous medium. The known water-insoluble substituted alpha-haloacetamides of this invention may first be dissolved in a suitable organic solvent and the organic solution of the active ingredient then incorporated in water or in any aqueous medium to produce a heterogeneous dispersion of the active ingredient in water.

One composition which aids in the effectivity of the herbicidal component is a surface-active agent which serves in providing uniform dispersions of all formulation components of both solid and liquid types, and may be anionic, cationic or non-ionic types, and includes conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensed with fatty acids, alkyl phenols and mercaptans, and other simple and polymeric compositions having both hydrophilic and hydrophobic functions so as to enable the mixing of otherwise immiscible ingredients. Generally, the surface-active agents will be only a minor portion of the formulation as used, for example, less than 10 percent and frequently as low as 0.05 percent. In general, concentrations of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil or plant surfaces.

A useful formulation of the herbicidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that, upon dilution with water or a solid extender, compositions containing optimum proportions of dispersing agents and active component will be prepared. The solid or liquid formulations are preferably applied by mechanical equipment involving spraying or spreading the formulation on soil or plant surfaces being treated. For this purpose, readily flowable compositions are required, either liquid or solid in physical state. Thus a critical aspect of the invention is the fluent carrier, without which the optimum herbicidal effects cannot be achieved.

Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of its weed-destroying properties. The described conditioning agents enable the proper use to achieve the desired herbicidal effects by an unskilled operator without elaborate equipment.

In addition to the above described herbicide conditioning agents other adjuvants may be added, such as insecticides, fungicides, nematocides and other herbicides. By the use of the subject compounds at the low grass specific levels of application, substantial benefits can be obtained by the addition thereto of a broad leaf specific herbicide. In this manner, formulations of efficient and effective use can be provided.

This application is a continuation-in-part of application Serial No. 389,494, filed October 30, 1953, and application Serial No. 455,738, filed September 13, 1954, both now abandoned.

What is claimed is:

1. The method of selectively inhibiting the germination and preemergent growth of grasses from seeds in contact with soil which comprises treating the said soil with a herbicidal amount consisting of from one to 15 pounds per acre of the compound having the structure:

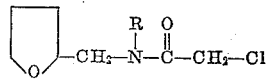

wherein R is an aliphatic hydrocarbon having up to six carbon atoms.

2. The method defined by claim 1 wherein the herbicidal compound is α-chloro-N-(2-furfuryl)-N-ethyl acetamide.

3. The method of selectively inhibiting the germination of grass seeds in contact with soil and the preemergence growth thereof in the presence of growing crops which comprises treating the said soil with a herbicidal amount of a compound having the structure:

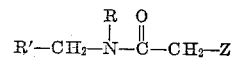

wherein Z is a halogen radical of the group consisting of bromine, chlorine and iodine; wherein R is a radical selected from the group consisting of the hydrogen atom, alkyl radicals having up to six carbon atoms, alkenyl radicals having up to six carbon atoms, alkynyl radicals having up to six carbon atoms, haloalkyl radicals having up to six carbon atoms, haloalkenyl radicals having up to six carbon atoms, and haloalkynyl radicals having up to six carbon atoms; and wherein R' is a radical selected from the group consisting of

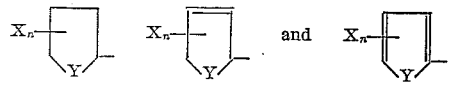

wherein Y is an atom selected from the group consisting of oxygen and sulfur; X is a radical selected from the group consisting of halogen atoms, alkyl radicals having up to four carbon atoms, and the nitro radical; and wherein $n$ is an integer from zero (0) to three (3).

4. The method of selectively inhibiting the germination and preemergent growth of grasses from seeds in contact with soil, which comprises treating the said soil with a herbicidal amount consisting of from one to fifteen pounds per acre of α-chloro-N-(2-furfuryl) acetamide.

5. The method of selectively inhibiting the germination of grass seeds in contact with soil and the preemergence growth thereof in the presence of growing crops, which comprises treating the said soil with a herbicidal amount of α-chloro-N-(2-furfuryl) acetamide.

6. The method of selectively inhibiting the germination of grass seeds in contact with soil and the preemergence growth thereof in the presence of growing crops, which comprises treating the said soil with a herbicidal amount of α-chloro-N-tetrahydrofurfuryl acetamide.

7. The method of selectively inhibiting the germination of grass seeds in contact with soil and the preemergence growth thereof in the presence of growing crops, which comprises treating the said soil with a herbicidal amount of α-chloro-N-thenyl acetamide.

8. The method of selectively inhibiting the germination of grass seeds in contact with soil and the preemergence growth thereof in the presence of growing crops, which comprises treating the said soil with a herbicidal amount of α-chloro-N-(thioxanylmethyl) acetamide.

9. The method of selectively inhibiting the germination of grass seeds in contact with soil and the preemergence growth thereof in the presence of growing crops, which comprises treating the said soil with a herbicidal amount of α-chloro-N-(2-furfuryl)-N-ethyl acetamide.

References Cited in the file of this patent
UNITED STATES PATENTS

| | | |
|---|---|---|
| 2,293,454 | D'Alelio | Aug. 18, 1942 |
| 2,771,469 | Surrey | Nov. 20, 1956 |

OTHER REFERENCES

Hamm et al. in J. of Agric. and Food, vol. 4, No. 6, June 1956, pages 518 to 522 incl.

H. E. Thompson et al., Botanical Gazette, vol. 107, 1946, pages 489 and 505 relied upon.